(12) United States Patent
Balduin et al.

(10) Patent No.: US 10,870,600 B2
(45) Date of Patent: Dec. 22, 2020

(54) BENDING TOOL FOR GLASS PANES

(71) Applicant: SAINT-GOBAIN GLASS FRANCE, Courbevoie (FR)

(72) Inventors: Michael Balduin, Alsdorf (DE); Jean-Marie Le Ny, Lima (PE); Dang Cuong Phan, Aachen (DE); Arthur Palmantier, Aachen (DE); Benno Dunkmann, Eupen (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/795,043

(22) Filed: Feb. 19, 2020

(65) Prior Publication Data

US 2020/0189953 A1     Jun. 18, 2020

Related U.S. Application Data

(63) Continuation of application No. 15/328,471, filed as application No. PCT/EP2015/070432 on Sep. 8, 2015, now Pat. No. 10,597,320.

(30) Foreign Application Priority Data

Oct. 28, 2014   (EP) .................................. 14190618

(51) Int. Cl.
*C03B 23/035* (2006.01)
*C03B 23/025* (2006.01)
(Continued)

(52) U.S. Cl.
CPC ...... *C03B 23/0357* (2013.01); *C03B 23/0252* (2013.01); *C03B 23/0302* (2013.01); *C03B 35/145* (2013.01)

(58) Field of Classification Search
CPC .... C03B 23/03; C03B 23/035; C03B 23/0352
See application file for complete search history.

(56) References Cited

U.S. PATENT DOCUMENTS 3,778,244 A   12/1973   Nedelec et al.
4,229,199 A   10/1980   Seymour
(Continued)

FOREIGN PATENT DOCUMENTS

CN   1764607 A    4/2006
DE   3615225 A1   11/1987
(Continued)

OTHER PUBLICATIONS

International Searcll Report for international Application No. PCT/EP2016/069317 filed on Aug. 15, 2016 on behalf of Saint-Gobain Glass France. dated Oct. 19, 2016. 5 Pages. (German Original + English Translation).

(Continued)

*Primary Examiner* — Cynthia Szewczyk
(74) *Attorney, Agent, or Firm* — Pillsbury Winthrop Shaw Pittman LLP

(57) ABSTRACT

A bending tool for bending at least one glass pane by suction, includes a frame-like convex contact surface and a cover having a peripheral air guide plate that surrounds the contact surface at least in regions is described. The bending tool is suitable for generating a first, reduced pressure in a first pressure region between the air guide plate and the contact surface; a second reduced pressure in a second pressure region. The second pressure is less than the first pressure; and a third pressure in a third pressure region, wherein the third pressure is greater than the first pressure.

7 Claims, 4 Drawing Sheets

Figure 1:
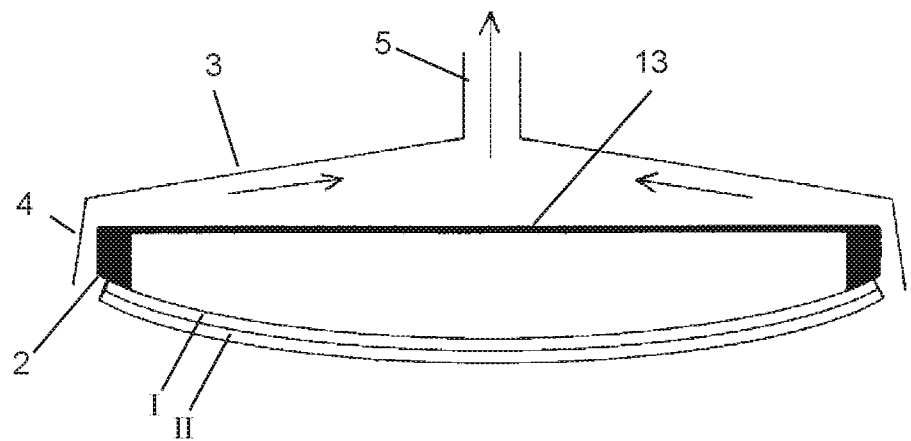

(51) Int. Cl.
*C03B 23/03* (2006.01)
*C03B 35/14* (2006.01)

(56) References Cited

U.S. PATENT DOCUMENTS

| | | | |
|---|---|---|---|
| 4,511,386 | A | 4/1985 | Kellar et al. |
| 4,678,495 | A | 7/1987 | Yoshizawa |
| 4,709,988 | A | 12/1987 | Kai |
| 4,738,704 | A | 4/1988 | Vanaschen |
| 4,764,196 | A | 8/1988 | Boutier |
| 4,877,437 | A | 10/1989 | Nitschke |
| 5,669,952 | A | 9/1997 | Claasen et al. |
| 5,713,976 | A | 2/1998 | Kuster |
| 5,833,729 | A | 11/1998 | Meunier |
| 6,138,477 | A | 10/2000 | Morin |
| 6,318,125 | B1 | 11/2001 | Diederen et al. |
| 6,668,589 | B1 | 12/2003 | Mizusugi et al. |
| 7,302,813 | B2 | 12/2007 | Balduin |
| 8,109,117 | B2 | 2/2012 | Balduin |
| 8,746,011 | B2 | 6/2014 | Balduin et al. |
| 8,978,418 | B2 | 3/2015 | Balduin et al. |
| 9,452,662 | B2 | 9/2016 | Balduin et al. |
| 2007/0144211 | A1 | 6/2007 | Hori |
| 2007/0157671 | A1 | 7/2007 | Thellier et al. |
| 2008/0134722 | A1 | 6/2008 | Balduin et al. |
| 2013/0323415 | A1 | 12/2013 | Brackley |
| 2013/0340479 | A1 | 12/2013 | Balduin |
| 2014/0011000 | A1 | 1/2014 | Dunkmann et al. |
| 2017/0217820 | A1 | 8/2017 | Balduin et al. |
| 2018/0194664 | A1 | 7/2018 | Balduin |

FOREIGN PATENT DOCUMENTS

| | | |
|---|---|---|
| DE | 69423700 T2 | 10/2000 |
| DE | 10105200 A1 | 8/2002 |
| EP | 0613865 A1 | 9/1994 |
| EP | 0706978 A2 | 4/1996 |
| EP | 1836136 B1 | 5/2011 |
| FR | 2097019 A1 | 3/1972 |
| JP | S49-110710 | 10/1974 |
| JP | S52-43855 | 2/1977 |
| JP | S63-027443 | 2/1988 |
| JP | H03-504003 | 9/1991 |
| JP | H06-256030 | 9/1994 |
| JP | H0B-183626 | 7/1996 |
| JP | 2002-527349 | 8/2002 |
| JP | 2008-526659 | 7/2008 |
| JP | 2014-504229 | 2/2014 |
| WO | WO 2006/072721 A1 | 7/2006 |
| WO | WO 2012/080071 A1 | 6/2012 |
| WO | WO 2012/080072 A1 | 6/2012 |
| WO | WO 2016/066309 A1 | 5/2016 |
| WO | WO 2017/029252 A1 | 2/2017 |

OTHER PUBLICATIONS

Non-Final Office Action for U.S. Appl. No. 15/328,475, filed Jan. 23, 2017 on behalf of Saint-Gobain Glass France. dated Mar. 18, 2019. 16 pages.
International Preliminary Report on Patentability for international Application No. PCT/EP2015/070432 filed on Sep. 8, 2015 in the name of Saint-Gobain Glass France. dated May 2, 2017. 8 pages.
International Preliminary Report on Patentability for international Application No. PCT/EP2016/069317 filed Aug. 15, 2016 on behalf of Saint-Gobain Glass France. dated Feb. 20, 2018. 5 pages.
Written Opinion for international Patent Application No. PCT/EP2016/069317 filed on Aug. 15, 2016 on behalf of Saint-Gobain Glass France. dated Oct. 19, 2016. 9 pages. (German Original+ English Translation).
International Preliminary Report on Patentability for international Application No. 010 PCT/EP2015/070430 filed Sep. 8, 2015 on behalf of Saint-Gobain Glass France. dated May 2, 2017. 7 pages.
Written Opinion for International Application No. PCT/EP2015/070430 filed Sep. 8, 2015 on behalf of Saint-Gobain Glass France. dated Nov. 24, 2015. 12 pages. (English Translation + German Original).
Written Opinion for International Application No. PCT/EP2015/070432 filed Sep. 8, 2015 on behalf of Saint-Gobain Glass France. dated Dec. 7, 2015. 14 pages. (English Translation + German Original).
International Search Report for International Application No. PCT/EP2015/070432 filed on Sep. 8, 2015 in the name of Saint-Gobain Glass France. (English translation and German original) dated Jul. 12, 2015.
International Search Report for International Application No. PCT/EP2015/070430 filed on Sep. 8, 2015 in the name of Saint-Gobain Glass France. (English translation and German original) dated Nov. 24, 2015.

BENDING TOOL FOR GLASS PANES

CROSS-REFERENCE TO RELATED APPLICATIONS

This application is a continuation of U.S. application Ser. No. 15/328,471, filed on Jan. 23, 2017, which is the U.S. National Stage of PCT/EP2015/070432, filed Sep. 8, 2015, which in turn claims priority to European Patent Application number EP 14190618.0, filed Oct. 28, 2014. The content of these applications are incorporated herein by reference in their entireties.

The invention relates to a bending tool for glass panes, a method for bending glass panes, and the use of the bending tool.

In the motor vehicle sector, bent composite glazings are common, in particular as windshields. It is known that it is advantageous to bend the individual panes of the composite glazing together simultaneously. Glass panes bent in pairs are matched with each other in terms of their curvature and are, consequently, especially suitable for laminating with one another to form the composite glazing. A method for paired bending of glass panes is known, for example, from DE 101 05 200 A1.

From WO 2006/072721 A1, WO 2012/080071 A1, and WO 2012/080072 A1, a tool that can be used as an upper mold in bending methods is known. The tool comprises a frame-like, convex contact surface and a cover having a peripheral air guide plate. By means of suction along the pane edges, the glass pane to be bent is pressed against the contact surface against the influence of gravity and, thus, securely held on the tool. Even two glass panes lying one atop the other can be simultaneously held in the tool. The tool can be used to transport the glass panes between various positions of the bending device, for example, to pick up the glass panes from one bending mold and to transfer them to another. The tool can also be used for a press bending step, in which the glass panes are shaped between the tool and a complementary counter mold under the action of pressure and/or suction.

U.S. Pat. No. 3,778,244 A discloses an upper bending tool with a concave or convex full-surface contact surface (full mold) and a cover having a peripheral air guide plate. By means of the air guide plate, the edge of the glass pane to be bent can be swept with a stream of air such that the glass pane is pressed for bending against the contact surface. In addition, the glass pane can be sucked thereagainst through openings in the full-surface contact surface.

Modern motor vehicle glazings have increasingly complex shapes with very pronounced radii of curvature in regions. In particular, the corners of modern panes should frequently have a very strong curvature. Strong curvatures in the edge region or corner region are, however, associated with the risk of bending defects in the center of the pane, such as an undesirable excessive bending or the creation of unevenness. There is, consequently, a need for new bending tools with which the complex pane geometries can be produced with high quality and in a manner reasonable from the standpoint of process technology.

The object of the present invention is to provide an improved bending tool, with which the strong local curvatures in the panes can be produced without creating bending defects elsewhere. The bending tool should in particular also be capable of simultaneous paired bending of two glass panes. A further object of the invention is to provide an improved method for bending glass panes.

The object of the invention is accomplished according to the invention by a bending tool in accordance with Claim Preferred embodiments are apparent from the subclaims.

The bending tool according to the invention for bending at least one glass pane by means of suction comprises a frame-like, convex contact surface and a cover having a peripheral, air guide plate that surrounds the contact surface at least in regions, wherein the bending tool is suitable for generating,
- a first, reduced pressure $p_1$ (holding pressure) in a first pressure region between the air guide plate and the contact surface;
- a second, reduced pressure $p_2$ (deformation pressure) in a second pressure region, wherein the second pressure $p_2$ is less than the first pressure $p_1$;
- a third pressure $p_3$ (compensation pressure) in a third pressure region, wherein the third pressure $p_3$ is greater than the first pressure $p_1$.

The pressures $p_1$, $p_2$, and $p_3$ indicated here are generated, in particular, on the bending-tool-facing surface of the glass pane to be bent.

As is more precisely specified in the following, the glass panes are securely held against the bending tool by the first pressure region. Strong local curvatures can be generated by the second pressure region. Bending defects, such as excessive bending, are effectively prevented by the third pressure region. Overall, the bending tool according to the invention ensures optimized pressure distribution, as a result of which more complex pane shapes can be realized in a simple manner from a production technology standpoint than with conventional tools. These are major advantages of the present invention.

The tool according to the invention belongs to the group of bending tools with which at least one glass pane is bent by suction. It is, in particular, not a tool for sag bending in which a glass pane is placed on a bending mold and is heated to bending temperature such that the shape of the pane adapts to the bending mold as a result of gravity. Instead, the bending tool according to the invention enables the active deformation of the heated glass pane, in that suction produced by a vacuum is exerted on the glass pane and distributed in a defined manner by the bending tool such that the heated and softened glass pane clings to the shape of the bending tool as a result of suction. The bending tool can also be referred to as a suction bending mold.

The bending tool according to the invention for bending at least one glass pane by means of suction includes a frame-like contact surface. It is thus not a so-called "full-surface bending tool", in which the glass pane gets its shape by being brought with its full surface into contact with a mold surface. Instead, it belongs to the group of bending tools wherein a peripheral region of the glass pane on the side edges or in the vicinity of the side edges is in direct contact with the tool, whereas most of the pane has no direct contact with the bending tool. Such a bending tool can also be referred to as a bending ring or a frame bending mold. In the context of the invention, the term "frame-like contact surface" serves only to distinguish the tool according to the invention from a full-surface bending mold. The contact surface need not form a complete frame, but can also be discontinuous. The contact surface is implemented in the form of a complete or discontinuous frame.

The width of the contact surface is preferably from 0.1 cm to 10 cm, particularly preferably from 0.2 cm to 1 cm, for example, 0.3 cm.

The bending tool is further equipped with a so-called "bending skeleton", which means a flat structure which bears the contact surface. The bending skeleton is implemented with the contact surface. The contact surface is arranged on the bending skeleton.

The bending tool according to the invention is a so-called "convex bending tool". This means that the contact surface is implemented convex such that the glass pane is bent into a convex shape. The term "convex shape" means a shape in which the corners and edges of the glass pane are bent closer in the direction of the tool than the center of the pane.

The bending tool according to the invention further includes a cover. The cover is arranged on the side of the contact surface facing away from the glass pane during the bending procedure. The cover enables the generation of the suction essential for the bending procedure. The suction is generated in particular by extracting the air between the cover and the bending skeleton.

The cover is implemented with a peripheral air guide plate surrounding the contact surface at least in regions. Such an air guide plate is frequently also referred to as an apron. The air guide plate is preferably arranged on the end of the cover. The air guide plate surrounds or frames the contact surface completely or in sections. During the bending procedure, the air guide plate preferably has a distance from the side edges of the glass pane of 3 mm to 50 mm, particularly preferably of 5 mm to 30 mm, for example, 20 mm.

The bending tool according to the invention is suitable for generating, in at least a first pressure region, a first, reduced pressure $p_1$. In the context of the invention, "reduced pressure" means a pressure that is less than the ambient pressure. With a reduced pressure, a vacuum relative to the ambient pressure is thus present. Suction is obtained by means of the reduced pressure. The region in which the first pressure $p_1$ acts, is referred to, in the context of the invention, as the first pressure region. The first pressure region is arranged in sections between the air guide plate and the contact surface. The first pressure region is not necessarily a single, contiguous region. Instead, the first pressure region typically consists of a plurality of sections with the same pressure separated from one another.

The first pressure region is suitable for sweeping the edge of the glass pane to be bent, at least in sections, with a stream of air and thus for pressing the glass pane against the contact surface. The stream of air generated by the first pressure $p_1$ is deflected by the air guide plate such that the side edge of the glass pane is swept at least in sections, By means of the stream of air, the glass pane is effectively held against the bending tool and pressed against the contact surface. Thus, the bending tool can be used in particular as the upper mold, wherein the glass pane is held against the bending tool against the influence of gravity by the stream of air sweeping the edge. The first pressure $p_1$ can also be referred to as holding pressure.

The term "an upper bending old" means a mold that contacts the upper surface of the glass pane facing away from the ground. "A lower bending mold" means a mold that contacts the lower surface of the glass pane facing the ground. The glass pane can be placed on a lower mold.

Even a plurality, for example, two glass panes lying one atop the other can be held simultaneously by the bending tool according to the invention. The tool is thus particularly suited for methods of paired bending, in which two individual panes that are intended to be laminated later to form a composite glazing can be simultaneously bent congruently together.

The bending tool according to the invention is further suitable for generating, in at least a second pressure region, a second reduced pressure $p_2$. The second pressure $p_2$ is, according to the invention, less than the first pressure $p_1$ (in other words, the vacuum is stronger in the second pressure region than in the first pressure region) such that the suction generated by the pressure $p_2$ is stronger than the suction generated by the pressure $p_1$. The glass pane is locally bent by the suction in the second pressure region. By means of the appropriate selection of the second pressure $p_2$, even strong local curvatures can be generated. The second pressure region can have a single section or even a plurality of sections.

The shape, into which the glass pane is bent in the second pressure region, is preferably determined by the contact surface, to which the glass pane clings as a result of the suction. The frame-shaped contact surface is accordingly implemented in accordance with the desired shape of the pane. Before bending, the glass pane is contacted by the contact surface in the first pressure region and held thereagainst. In the second pressure region, there is no direct contact between the glass pane and the contact surface before bending. During the bending process, the softened glass pane clings in the second pressure region to the contact surface, by which means the desired shape of the glass panes is achieved. The second pressure $p_2$ can also be referred to as deformation pressure or bending pressure.

In a typical application, corners of the glass pane are to be provided with a particularly pronounced curvature. For example, it can be desirable for two adjacent corners to be provided with a particularly pronounced curvature, typically the upper (in the installed position of the pane) corners or the lower (in the installed position of the pane) corners. However, it can, for example, also be desirable for all four corners of the glass pane to be provided with a particularly pronounced curvature. The second pressure region preferably has a plurality of sections that are arranged in the region of those corners of the pane to be bent that are to be provided with a particularly strong curvature. The first pressure region is preferably arranged along the side edges of the pane to be bent between sections of the second pressure region.

The term "a corner of the bending tool" means, in the context of the invention, the region of the bending tool that is provided to be brought into contact with a corner of the glass pane to be bent. Likewise, "an edge of the bending tool" means the region that is provided to be brought into contact with an edge of the pane to be bent.

In a preferred embodiment, the second pressure region is arranged in at least one corner of the bending tool and is suitable for providing at least one corner of the glass pane with a curvature that is preferably stronger than the curvature of the rest of the glass pane.

In a particularly preferred embodiment, the second pressure region comprises two sections, with the two sections arranged in two adjacent corners of the bending tool. The two sections are suitable for providing two adjacent corners of the glass pane to be bent with a curvature that is preferably stronger than the curvature of the rest of the glass pane. The two corners are, for example, the two upper or the two lower corners of the glass pane. In this case, the first pressure region preferably also comprises two sections that extend between the sections of the second pressure region along the side edges of the glass pane.

In another particularly preferred embodiment, the second pressure region comprises four sections, with each section arranged in a corner of the bending tool. The sections are suitable for providing each corner of the glass to be bent with a curvature that is preferably stronger than the curvature of the rest of the glass pane. Here, it is assumed that the glass pane is substantially rectangular, as is customarily the case in the glazing sector. Here, the first pressure region preferably also comprises four sections that extend between the sections of the second pressure region along the side edges of the glass pane.

The curvature need not be identically designed in different sections of the second pressure region. Typically, a different curvature is desirable for the lower corners of the glass panes than for the upper corners of the glass pane. This can be realized through the shape of the contact surface.

The bending tool according to the invention is preferably provided with a suction pipe, with which suction can be generated. The suction pipe is preferably arranged on the side of the bending tool facing away from the contact surface. The first pressure region and the second pressure region are connected to the suction pipe such that air is extracted from the first and second pressure region, by which means the first pressure $p_1$ and the second pressure $p_2$ are generated. The different pressures $p_1$ and $p_2$ can be achieved by appropriate design of the bending tool, in particular by the appropriate design of the conduit cross-section such that the suction of the common suction pipe is suitably divided between the first pressure region and the second pressure region.

Although this is clearly more complex technically, the first pressure region and the second pressure region can, however, also each have their own suction pipe for generating the first or the second pressure.

The bending tool according to the invention is further suitable for generating, in at least a third pressure region, a third pressure $p_3$. The third pressure $p_3$ is, according to the invention, greater than the first pressure $p_1$ (in other words the vacuum is less strong in the third pressure region than in the first pressure region) such that the suction generated by the pressure $p_3$ is less than the suction generated by the pressure $p_1$. The third pressure $p_3$ can correspond to the ambient pressure such that no negative pressure and thus no suction is present in the third pressure region. By means of the third pressure region, undesirable excessive bending, which would spread to other regions of the pane as a result of strong bending of the second pressure region, is effectively compensated and reduced. By means of the separate third pressure region with the low pressure $p_3$, regions with less curvature can be generated in a pane that has a very strong curvature in other regions. The third pressure $p_3$ can also be referred to as compensation pressure.

In a preferred embodiment, the third pressure region is arranged in a central region of the bending tool inside the contact surface. This means that the third pressure region is surrounded by the frame-like contact surface. The third pressure region is suitable for providing a central region of the glass pane to be bent with less curvature than one or a plurality of edge regions of the glass pane. The edge regions of the glass pane can be provided by the second pressure region with a strong curvature, which would result per se in an undesirable excessive bending in the center of the pane. By means of the third pressure region according to the invention, the bending action in the center of the pane can advantageously be influenced independently of the second pressure region. Due to the higher pressure in the third pressure region, the suction is less pronounced and the center of the pane is less strongly bent.

In an advantageous embodiment, the bending tool is provided with at least one vent pipe, which enables complete or partial pressure equalization between the surroundings and the third pressure region. Air is entrained from outside through the vent pipe. The third pressure $p_3$ can thus be increased relative to the first pressure $p_1$ and the second pressure $p_2$.

The vent pipe is provided, in a preferred embodiment, with a valve for regulating the flow. By this means, the third pressure $p_3$ can be actively regulated.

The third pressure region can be connected to the above-described common suction pipe for the first and second pressure region, by which means the higher third pressure $p_3$ is reached through the suitable design of the conduit cross-section and/or at least one vent pipe. The third pressure region can, alternatively, also have its own suction pipe.

The bending tool can include additional pressure regions with different values for the pressure. For example, in addition to the second pressure region, at least one more pressure region with increased suction can be provided.

The object of the invention is further accomplished by a method for bending at least one glass pane with a bending tool according to the invention. The method according to the invention comprises at least the following process steps:

The glass pane is heated to bending temperature. Here, the term "bending temperature" means a temperature at which the glass pane is sufficiently softened to be able to be deformed. Typical bending temperatures are from 500° C. to 700° C., preferably from 550° C. to 650° C.

The glass pane is brought into contact with the contact surface such that the edge of the glass pane is swept at least in sections by a stream of air generated by the first reduced pressure $p_1$. For this, the edge of the glass pane is preferably arranged, at least in sections, in the first pressure region.

The second pressure $p_2$ is generated in the second pressure region and the third pressure $p_3$ is generated in the third pressure region, by which means the glass pane is bent.

The order of the process steps mentioned is, basically, not fixed. For example, the glass pane can, in principle, first be brought into the contact with the contact surface of the bending tool and held by the action of the first pressure, the glass pane subsequently heated to bending temperature, and, thereafter, bent by the action of the second and third pressures.

When the bending tool is provided with a single suction pipe, with the different pressure regions generated by appropriate conduit cross-sections inside the bending tool (the overall effect of the suction pipe is thus suitably divided among the pressure regions through the design of the bending tool), the different pressures at the time of the contacting of the bending tool with the pane to be bent are generated virtually simultaneously. The first pressure continues to be applied during the action of the second and third pressures such that the glass pane is securely held on the bending tool during the entire bending process. The first pressure is preferably not turned off until the glass pane is to be separated from the bending tool.

In an advantageous embodiment, the method is simultaneously used on at least two, preferably two glass panes lying one atop the other. The glass panes are simultaneously bent pairwise (in other words as pairs of panes). The curvature of the two glass panes is then particularly congruent and matched to one another such that the panes are particularly suitable for being laminated to each other to form a composite glazing of high optical quality.

In an advantageous embodiment, the bending tool according to the invention is used as an upper bending mold. By means of the stream of air sweeping the edge of the glass pane in the first pressure region, which is generated by the first, reduced pressure, the glass pane can be reliably held against the bending tool against the action of gravity. The first pressure region is also suitable for simultaneously holding a plurality of glass panes lying one atop the other.

The first pressure $p_1$ is, in a preferred embodiment, based on the ambient pressure, a vacuum from 1 mbar to 20 mbar, particularly preferably from 2 mbar to 10 mbar, most particularly preferably from 3 mbar to 6 mbar. If the ambient pressure is assumed to be approximately 1 bar (standard conditions), the first pressure $p_1$ is thus preferably from 980 mbar to 999 mbar, particularly preferably from 990 mbar to 998 mbar, most particularly preferably from 994 mbar to 997 mbar. Thus, sufficient suction is obtained along the pane edges such that the bending tool can be used as the upper bending mold. Glass panes, even a plurality of glass panes simultaneously, can advantageously be sucked and held against the bending tool.

The second pressure $p_2$ is, in a preferred embodiment, based on the ambient pressure, a vacuum from 10 mbar to 100 mbar, particularly preferably from 20 mbar to 80 mbar, most particularly preferably from 30 mbar to 60 mbar. If the ambient pressure is assumed to be approximately 1 bar (standard conditions), the second pressure $p_2$ is thus preferably from 900 mbar to 990 mbar, particularly preferably from 920 mbar to 980 mbar, most particularly preferably from 940 mbar to 970 mbar. Thus, pronounced curvatures, in particular at the corners of the panes, can be obtained.

The third pressure $p_3$ is, in a preferred embodiment, based on the ambient pressure, a vacuum from 0 mbar to 5 mbar, particularly preferably from 0 mbar to 2 mbar, most particularly preferably from 0 mbar to 1 mbar. There is thus, based on the ambient pressure, a vacuum of at most 5 mbar, particularly preferably at most 2 mbar, most particularly preferably at most 1 mbar. Thus, excessive bending as a result of the strong curvatures in the second pressure region can be effectively prevented. If the ambient pressure is assumed to be approximately 1 bar (standard conditions), the third pressure $p_3$ is thus preferably at least 995 mbar, particularly preferably at least 998 mbar, most particularly preferably at least 999 mbar. In an advantageous embodiment, the third pressure $p_3$ corresponds to the ambient pressure.

In an advantageous embodiment of the method, the glass pane is first heated to bending temperature. This is preferably done in a lower mold, on which the pane is placed. The lower mold is preferably a concave mold complementary to the bending tool according to the invention. The lower mold is suitable, in particular for sag bending. By means of heating to bending temperature, the glass pane is softened and clings under the effect of gravity to the first lower bending mold. The glass pane or glass panes are, in this advantageous embodiment, thus pre-bent using sag bending, before they are further bent with the bending tool according to the invention.

After pre-bending by sag bending, the bending tool according to the invention is preferably brought from above into proximity with the glass pane or glass panes in the lower bending mold. The bending tool according to the invention thus acts as an upper bending mold. The glass pane (or the glass panes) is taken over by suction by the bending tool according to the invention and held thereon. The bringing into proximity can be done by an upward movement of the lower bending mold and/or by a downward movement of the bending tool according to the invention. After the transfer of the glass pane(s), the glass pane is bent with the bending tool according to the invention.

The shape of the glass pane produced by bending with the tool according to the invention can be its final shape. In an advantageous embodiment, pre-bending is produced by the bending tool according to the invention, whereas the final shape of the glass pane is produced in at least one subsequent bending step. By this means, still more complex pane shapes can be produced.

The subsequent bending into the final pane shape can, for example, be done by sag bending. For this, the glass pane is transferred into a lower bending mold suitable for sag bending by the bending tool according to the invention by switching off the first pressure $p_1$.

The subsequent bending into the final shape can also, for example; be done by press bending, preferably between the upper bending tool according to the invention and a lower bending tool. In this case; the deformation of the glass pane is done by pressure and/or suction of the two complementary bending tools.

The cooling of the glass pane(s) after bending can be done on the bending tool according to the invention. The glass pane is, however, preferably transferred to a lower mold for cooling. The lower mold can be a holding mold for cooling provided specifically for this. The lower mold can, however, also be the mold for a sag bending step, if such is provided.

The particular advantage of the bending tool according to the invention is that panes with a strong local curvature can be produced, while other regions of the pane have only a slight curvature. The regions with strong curvature are produced; in particular, in the second pressure region (preferably in the corners of the pane), whereas the regions with less curvature are produced by the third pressure region (preferably in the center of the pane). A pane according to the invention can, for example, be provided
    in the second pressure region with a bend radius of at most 500 mm, preferably from 50 mm to 300 mm, and
    in the third pressure region with a bend radius of at least 1000 mm, preferably from 2000 mm to 20,000 mm.

The bend radius in the first pressure region is, for example, at most 5000 mm, preferably from 1000 mm to 2000 mm.

The glass pane or the glass panes preferably contain soda lime glass, but, alternatively, can also contain other types of glass such as borosilicate glass or quartz glass. The thickness of the glass panes is typically 0.5 mm to 10 mm, preferably 1 mm to 5 mm.

When two or more glass panes are bent simultaneously, a separation means is preferably arranged between the panes such that the panes do not permanently adhere to one another.

The bending tool according to the invention is preferably used for bending glass panes in the motor vehicle sector. The method is suitable, in particular, for paired bending of glass panes that are provided as components of a composite glazing. Such a composite glazing is preferably a windshield, but can also be a roof pane, side pane, or rear pane.

In the following, the invention is explained in detail with reference to drawings and exemplary embodiments. The drawings are schematic depictions and not to scale. The drawings in no way limit the invention.

They depict:
    FIG. 1 a cross-section through a generic bending tool according to the prior art,
    FIG. 2 a plan view of an embodiment of the bending tool according to the invention,
    FIG. 3 a cross-section along A-A' through the bending tool of FIG. 2,
    FIG. 4 a cross-section along B-B' through the bending tool of FIG. 2, FIG. 5 a stepwise depiction of an embodiment of the method according to the invention, and FIG. 6 a flowchart of an embodiment of the method according to the invention.

FIG. 1 depicts a tool for glass bending processes according to the prior art. The tool is an upper mold that is suitable for holding two glass panes I, II lying one atop the other against a frame-like, convex contact surface 2 by means of suction against the influence of gravity. The contact surface 2 is arranged on a so-called bending skeleton 13. For generating the suction, the tool includes a suction pipe 5, via which the air is extracted. The tool further has a cover 3, whose end is equipped with a peripheral air guide plate 4. The air guide plate 4 surrounds the contact surface 2 peripherally. By means of the bending skeleton 13 and the cover 3 with the air guide plate 4, the stream of air generated through the suction pipe is guided such that it sweeps the edges of the glass pane. Thus, the pair of glass panes I, II is securely held against the contact surface 2.

The panes I, II are pre-bent, for example, by sag bending in a lower bending mold. The tool depicted can, for example, be used, to pick up the pair of glass panes I, II out of the lower mold and to transfer it to another mold. For example, the pair of glass panes I, II can be subjected to a press bending process, wherein it is deformed between the tool depicted and a counter mold under the effect of pressure and/or suction.

The tool and bending method in which it can be used depicted, are known from WO 2006/072721 A1, WO 2012/080071 A1, and WO 2012/080072 A1.

Figure 2:
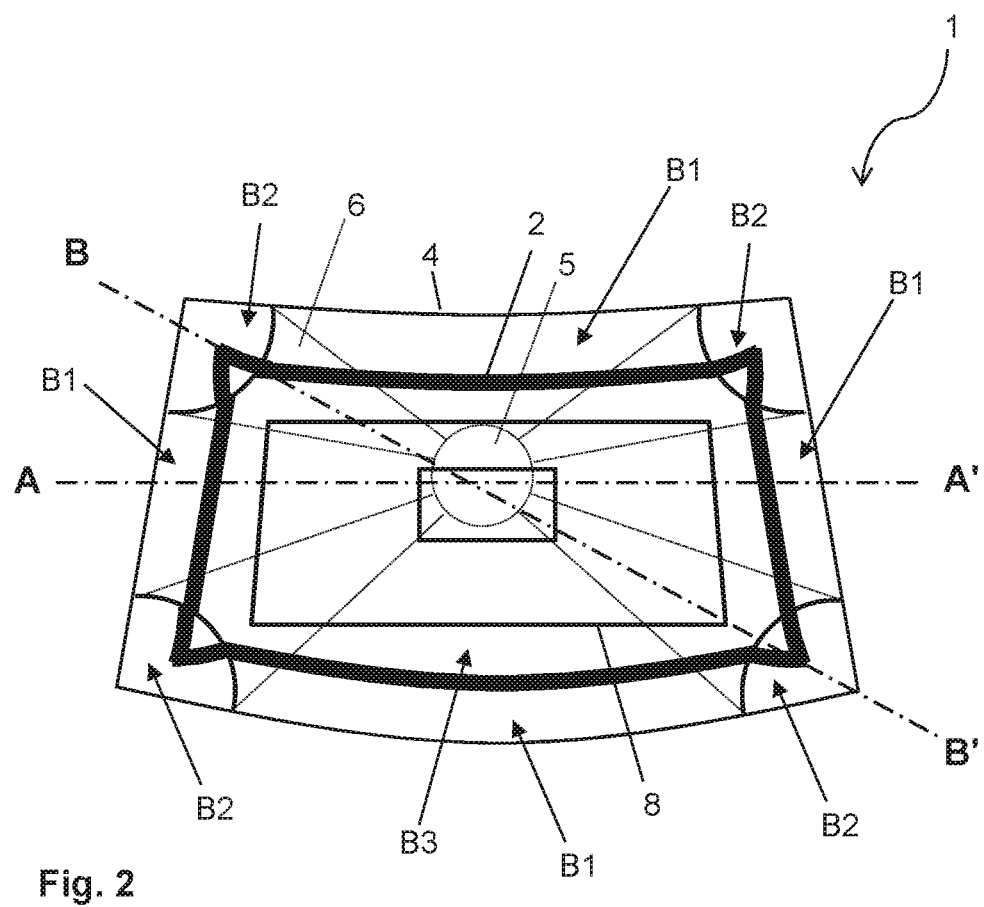
Figure 3:
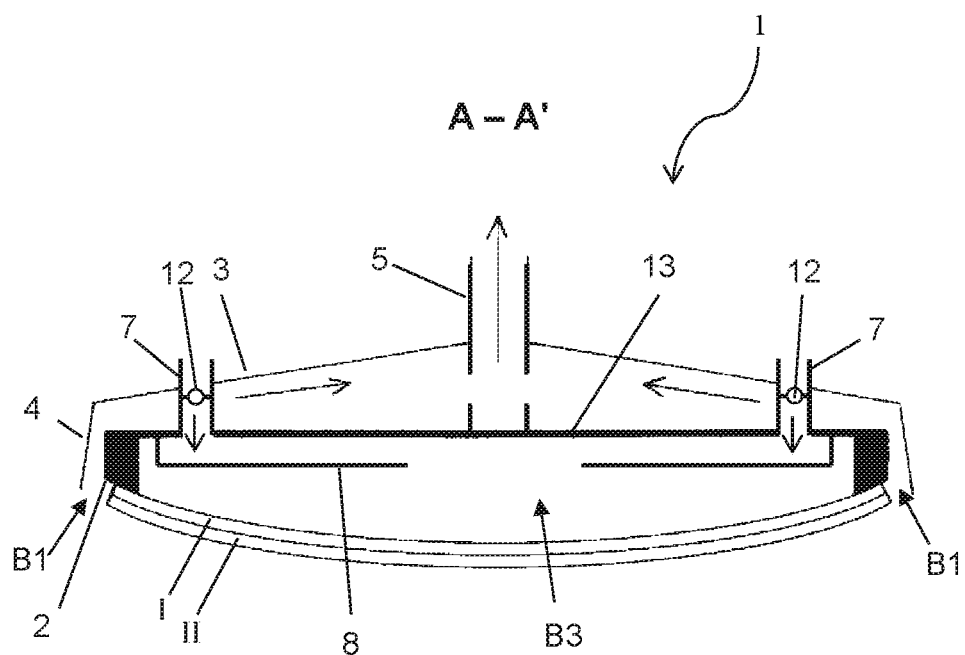
Figure 4:
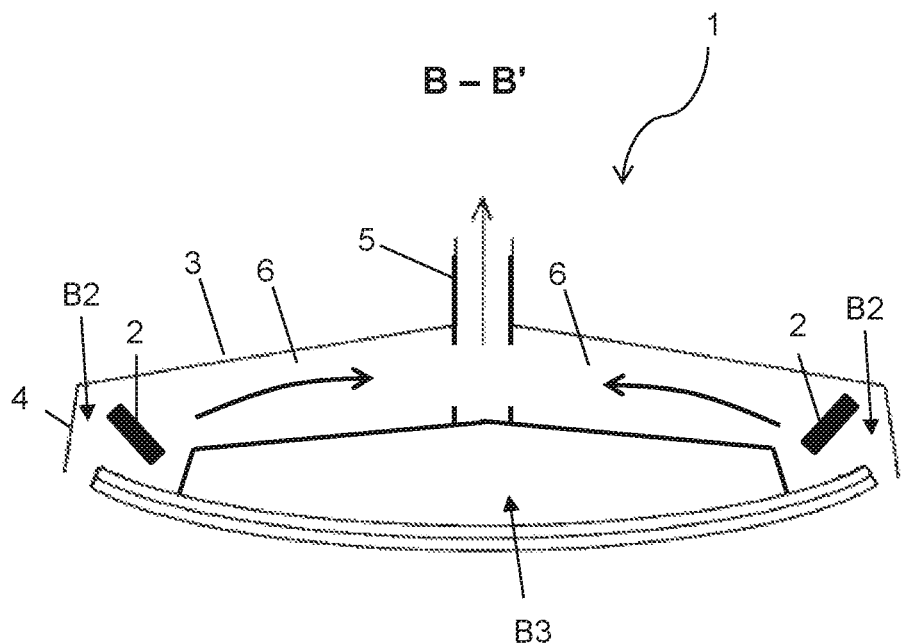

FIG. 2, FIG. 3, and FIG. 4 each depict a detail of an improved bending tool 1 according to the invention. The bending tool 1 is, like the tool in FIG. 1, an upper mold for a bending process. FIG. 2 depicts a plan view of the lower side of the tool bending 1 provided for contacting with the glass pane to be bent, whereas FIGS. 3 and 4 depict, in each case, a cross-section.

The bending tool 1 has, like the tool of FIG. 1, a suction pipe 5 for generating suction, as well as a cover 3 with an air guide plate 4 and a bending skeleton 13 with a frame-like contact surface 2. In contrast with the known tool, the suction in the bending tool is selectively divided, by which means an optimized pressure distribution is produced. This enables realizing more complex pane shapes. The glass panes can be provided by the bending tool 1 according to the invention, for example, with pre-bending, and can be brought, in a subsequent bending step, for instance, by press bending or sag bending, into their final shape. Pre-bending with the bending tool 1 according to the invention enables a more complex final pane shape.

The bending tool has three different pressure regions B1, B2 and B3, in which different pressures that act on the glass panes I, II can be generated. The second pressure region B2 has four sections, with each section arranged in one corner of the bending tool 1. A corner of the bending tool 1 is, in this case, the region that is provided to act on one corner of the glass pane I, II to be bent. The first pressure region B1 likewise has four sections, with each section arranged along one side edge of the bending tool 1 between air guide plate 4 and contact surface 2 and running between two adjacent sections of the second pressure region B2. Here, a side edge of the bending tool 1 is the region that is provided to act on a side edge of the glass pane I, II to be painted. The third pressure region B3 is arranged in the central region of the bending tool 1 surrounding the contact surface 2.

The bending tool 1 is suitable for generating, in the first pressure region B1 a first, reduced pressure $p_1$. The pressure $p_1$ results in an upwardly directed stream of air between air guide plate 4 and contact surface 2. When one or a plurality of glass panes I, II are in contact according to the invention with the bending tool 1, the side edges of the glass panes are swept by the stream of air. The stream of air is suitable for holding one or even a plurality of glass panes lying atop one another, against the influence of gravity, against the contact surface of the bending tool 1. The first pressure $p_1$ in the first pressure region B1 thus fulfills the function of the stream of air in the tool according to the prior art of FIG. 1. A first pressure $p_1$, which corresponds, based on the ambient pressure, to a vacuum of 3 mbar to 6 mbar, is suitable for holding a pair of glass panes I, II each having a typical pane thickness of roughly 2.1 mm.

The bending tool 1 is further suitable for generating, in the second pressure region B2, a second, reduced pressure $p_2$, which is lower than the first pressure $p_1$. The suction in the second pressure region B2 is thus greater than in the first pressure region B1. Whereas the glass panes are merely to be held by the stream of air in the first pressure region B1, active deformation of the pane is to be obtained in the second pressure region B2 by means of the stream of air. The contact surface 2 in the second pressure region B2 is set back compared to that in the first pressure region B1 such that the glass panes are not in contact with the contact surface 2 before the bending operation. By means of the suction in the second pressure region B2, the softened glass panes I, II are bent and cling to the contact surface 2. The sections of the second pressure region B2 are arranged in the corners of the bending tool 1. By means of the strong suction in the second pressure region B2, the corners of the glass panes I, II can be provided with a curvature that is stronger than the curvature of the rest of the pane. Thus, very complex pane shapes can be realized. The shape of the pane corners affected by the bending operation, which is typically different for the lower corners and the upper corners, is determined by the contact surface 2. A second pressure $p_2$, which is, based on the ambient pressure, a vacuum from 30 mbar to 60 mbar, is, for example, suitable for bending a pair of glass panes I, II with a typical pane thickness of roughly 2.1 mm each.

The bending tool 1 is further suitable for generating, in the third pressure region B3, a third pressure $p_3$, which is greater than the first pressure $p_1$. The suction is, in the third pressure region B3, thus less than in the first pressure region B1 and in the second pressure region B2, The third pressure region B3 effectively prevents excessive bending in the central region of the glass panes I, II due to the strong curvature in the second pressure region B2. The expression "excessive bending" refers to the production of an undesirable counter curvature as a result of a strong curvature in an adjacent region. The third pressure region B3 effectively prevents excessive bending and other bending defects, for instance, unevenness in the central region of the glass panes I, II. A typical third pressure $p_3$ is, for example, roughly the ambient pressure or is only slightly below it with a vacuum of, for example, 1 mbar.

A vacuum in the suction pipe 5 that is suitable for being divided among the pressure regions as described above, is, for example, roughly 80 mbar.

To generate the suction, the bending tool 1 has a suction pipe 5. The suction pipe 5 is arranged on the side of the bending tool 1 facing away from the contact surface 2, i.e., the top. The pressure regions B1, B2, and B3 are connected to the suction pipe, by which means a reduced pressure is generated. The cover 3 and the skeleton 13 bearing the contact surface 2 form a conduit between the first pressure region B1 and the suction pipe 5, as is known from the tool according to the prior art of FIG. 1. In the bending tool 1 according to the invention, additional conduits 6 are implemented, which connect the sections of the second pressure region B2 to the suction pipe 5. The different pressures $p_1$ and $p_2$ are realized by means of appropriately selected conduit cross-sections. The extracted air is indicated in the figures by arrows.

The suction pipe 5 and the conduits 6 are actually not discernible in the plan view of FIG. 2; however, their position is indicated by dotted lines.

The third pressure region B3 has a connection (not shown in the figures) to the suction pipe 5, by means of which a reduced pressure $p_3$ is also generated in the third pressure region B3. The bending tool 1 has vent pipes 7 for increasing the third pressure $p_3$. The vent pipes 7 run between the bending skeleton 13 and the cover 3 and connect the third pressure region B3 to the surroundings on the side of the bending tool facing away from the contact surfaces 2. The third pressure $p_3$ results from the suction of the suction pipes 5 and the air entrained through the vent pipes 7. The vent pipes 7 are provided with valves 12 for active regulation of the third pressure $p_3$. The entrained air is indicated in the figures by arrows.

The bending skeleton 13 is provided with a deflector plate 8, which has a central opening. The deflector plate 8 deflects the air entrained through the vent pipes 7 such that it flows roughly centrally into the third pressure region B3. By this means, a homogeneous dispersion is achieved, which is advantageous for the surface of the glass pane. A centrally mounted central vent pipe is not possible in the embodiment depicted since the space needed for it is occupied by the central suction pipe 5.

Figure 5:
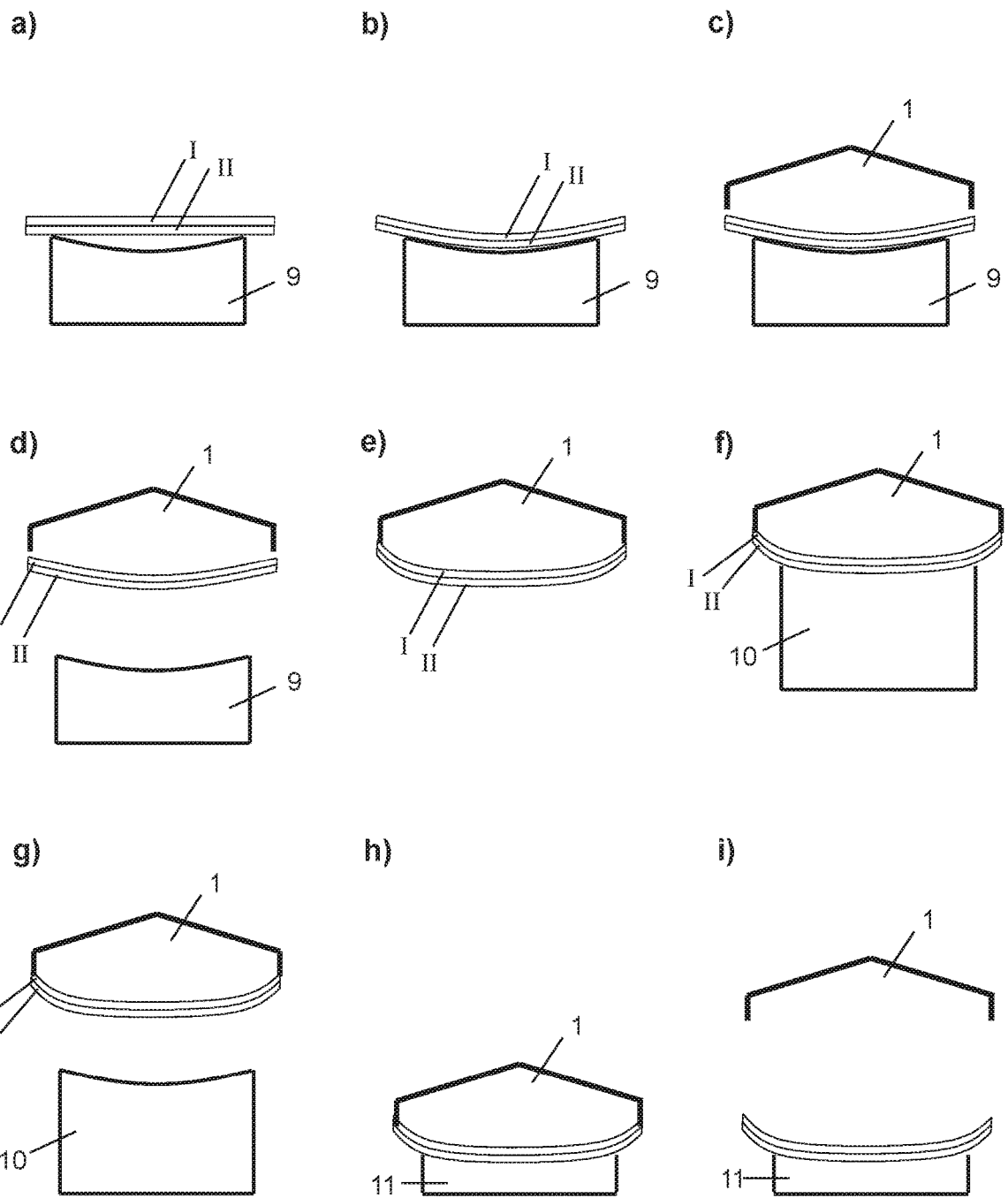

FIG. 5 depicts steps of an exemplary embodiment of the method according to the invention. First, two glass panes I, II lying one atop the other, which are flat in the initial state, are positioned on a lower bending mold 9 (Part a). The panes on the bending mold 9 are heated to bending temperature, for example, 600° C., and cling as a result of gravity to the shape of the lower bending mold 9 (Part b). The glass panes I, II are thus pre-bent by sag bending. After the sag bending, the glass panes I, II are taken over by the bending tool 1 according to the invention. To that end, the bending tool 1 is brought into proximity with the glass panes I, II on the lower bending mold 9 from above and brought into contact with the contact surface 2 (Part c). Then, suction is generated via the suction pipe 5. Due to the first pressure $p_1$, the glass panes I, II are held against the bending tool 1 and can be moved upward by it and thus removed from the lower bending mold 9 (Part d). The second pressure $p_2$ effects the further bending of the corners of the pane, whereas the third pressure $p_3$ prevents bending defects in the center of the pane. By means of the bending tool 1, a further pre-bending into a more complex shape is achieved (Part e). Then, a lower suction bending mold 10 is brought into proximity with the glass panes I, II from below. The glass panes I, II are bent between the bending tool 1 according to the invention and the lower suction bending mold 10 by press bending into their final shape (Part f). The lower suction bending mold 10 is subsequently lowered again (Part g) and the glass panes I, II are placed by means of the bending tool 1 on a lower holding mold 11 and transferred to this holding mold 11 by turning off the suction (Part h). The bending tool 1 is then moved upward (Part i) and is ready for the bending process of the next pair of panes. On the lower holding mold 11, the glass panes I, II cool to the ambient temperature. The same mold or a mold designed the same as the first lower bending mold 9 (sag bending mold) can be used as the lower holding mold 11.

By means of the method according to the invention, due to the pre-bending with the bending tool 1 according to the invention, clearly more complex pane shapes can be obtained than with prior art methods. That is the major advantage of the present invention.

The upstream and downstream process steps of the bending with the bending tool 1 presented must be understood merely as examples and in no way restrict the invention. Thus, for example, the final pane shape can be achieved by sag bending instead of press bending. It is also conceivable that the final pane shape is achieved merely with the bending tool 1 according to the invention without a further bending step.

Figure 6:
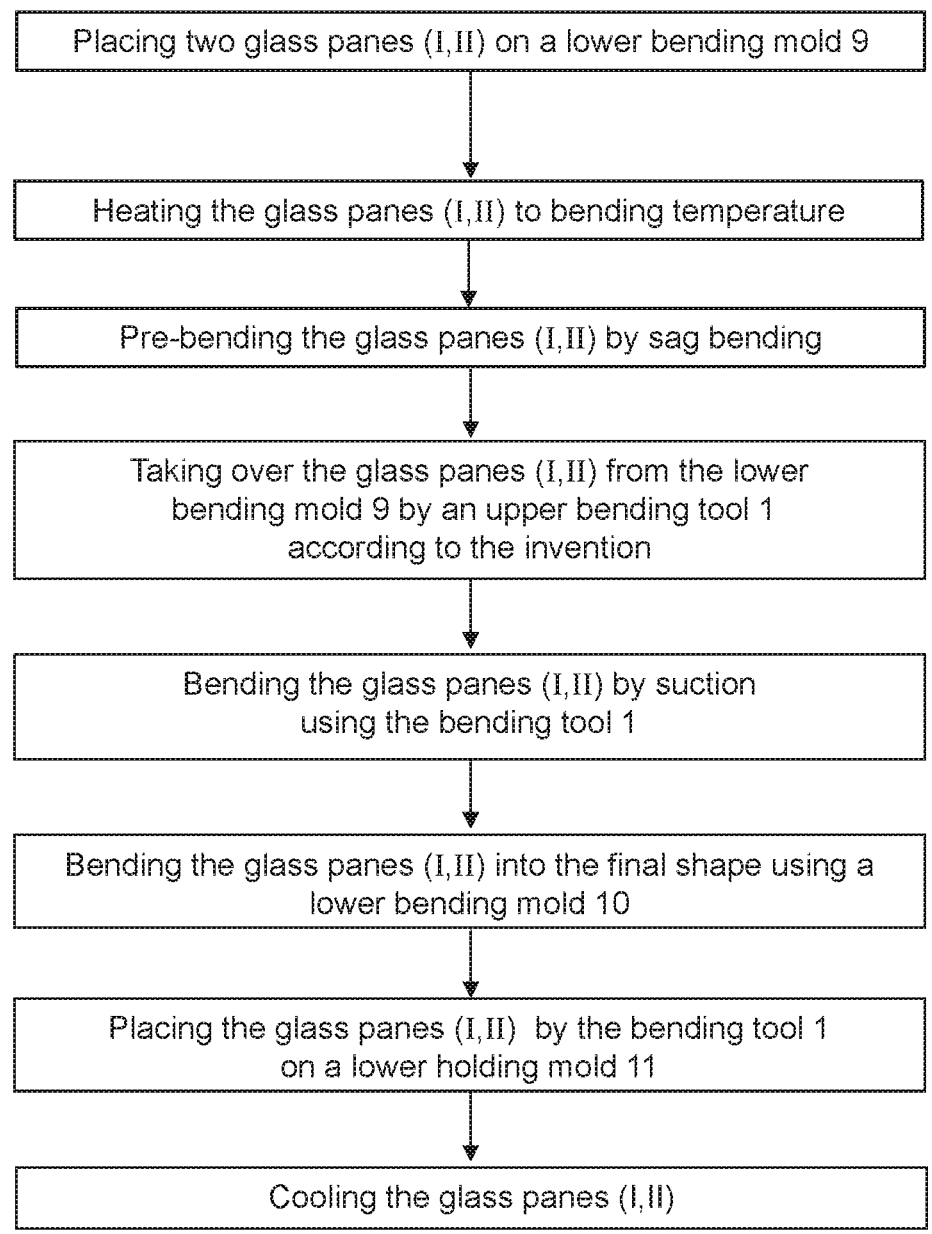

FIG. 6 depicts the exemplary embodiment of FIG. 5 using a flowchart.

LIST OF REFERENCE CHARACTERS (1) bending tool
(2) frame-like contact surface
(3) cover
(4) air guide plate
(5) suction pipe
(6) conduit between B2 and 5
(7) vent pipe
(8) deflector plate
(9) lower sag bending mold
(10) lower suction bending mold
(11) holding mold
(12) valve of 7
(13) bending skeleton
(B1) first pressure region
(B2) second pressure region
(B3) third pressure region
($p_1$) first, reduced pressure
($p_2$) second, reduced pressure
($p_3$) third pressure
(I) glass pane
(II) glass pane

The invention claimed is:

1. A bending tool for bending at least one glass pane by means of suction, the bending tool comprising:
a frame-like, convex contact surface; and
a cover having a peripheral air guide plate that surrounds the convex contact surface at least in regions,
wherein the bending tool is configured to generate:
a first, reduced pressure in a first pressure region between the peripheral air guide plate and the convex contact surface,
a second, reduced pressure in a second pressure region, wherein the second pressure is less than the first pressure, and
a third pressure in a third pressure region, wherein the third pressure is greater than the first pressure,
wherein the bending tool is constructed and arranged to contact a peripheral portion of a main surface of the glass pane such that a majority of the main surface of the glass pane is without contact with the bending tool during bending of the glass pane by the bending tool, and wherein the convex contact surface contacts said peripheral portion during the bending.

2. The bending tool according to claim 1, wherein the bending tool is further configured to generate the first pressure region for suctioning an edge of the glass pane to be bent with a stream of air at least in sections, and for pressing the glass pane against the convex contact surface.

3. The bending tool according to claim 1, wherein the bending tool is further configured to generate the second pressure in at least one corner of the bending tool, and to bend at least one corner of the glass pane at a sharper angle than a remaining portion the glass pane.

4. The bending tool according to claim 1, wherein the bending tool is further configured to generate the third pressure region in a central region inside the convex contact surface, and to bend a central region of the glass pane at a shallower angle than an edge region of the glass pane.

5. The bending tool according to claim 1, further comprising a suction pipe connecting the first pressure region and the second pressure region.

6. The bending tool according to claim 1, further comprising at least one vent pipe connecting the third pressure region with air surrounding the bending tool.

7. The bending tool according to claim 6, wherein the at least one vent pipe comprises a valve for regulating air flow.

* * * * *